United States Patent [19]

Pitts

[11] 4,195,775

[45] Apr. 1, 1980

[54] SOLAR ENERGY SYSTEM

[76] Inventor: Edward T. Pitts, Hermitage, Tenn. 37076

[21] Appl. No.: 952,342

[22] Filed: Oct. 18, 1978

Related U.S. Application Data

[63] Continuation-in-part of Ser. No. 788,257, Apr. 18, 1977, abandoned.

[51] Int. Cl.² ............................................. F24J 3/02
[52] U.S. Cl. .................................. 126/425; 126/428; 126/438; 350/296
[58] Field of Search ............... 237/1 A, 56; 126/270, 126/271, 400, 101; 350/293, 296, 288; 250/347

[56] References Cited

U.S. PATENT DOCUMENTS

| | | | |
|---|---|---|---|
| 2,872,915 | 2/1959 | Bowen | 126/271 |
| 2,902,028 | 9/1959 | Manly | 126/271 |
| 3,267,806 | 8/1966 | Azegami | 350/296 |
| 3,841,738 | 10/1974 | Caplan | 126/271 |
| 3,977,601 | 8/1976 | Beanzi | 126/271 |
| 3,980,071 | 9/1976 | Barber, Jr. | 237/1 A |
| 3,996,917 | 12/1976 | Trihey | 126/270 |
| 3,998,206 | 12/1976 | Jahn | 126/271 |
| 4,000,734 | 1/1977 | Matlock et al. | 126/271 |
| 4,022,184 | 5/1977 | Anderson | 126/271 |
| 4,031,385 | 6/1977 | Zerlant et al. | 126/270 |
| 4,034,738 | 7/1977 | Barber, Jr. | 237/1 A |
| 4,038,971 | 8/1977 | Bezborodko | 126/271 |
| 4,038,972 | 8/1977 | Orrison | 126/271 |
| 4,138,993 | 2/1979 | Conley | 237/1 A |

Primary Examiner—Henry C. Yuen
Attorney, Agent, or Firm—Abe Hatcher

[57] ABSTRACT

Rays of the sun are concentrated by a plexiglas mirror so as to heat water in a collector which, moving with the mirror, both vertically and horizontally tracks the sun. The heated water is piped to a radiation unit adapted to be placed in a central hot air heating-air conditioning unit.

4 Claims, 11 Drawing Figures

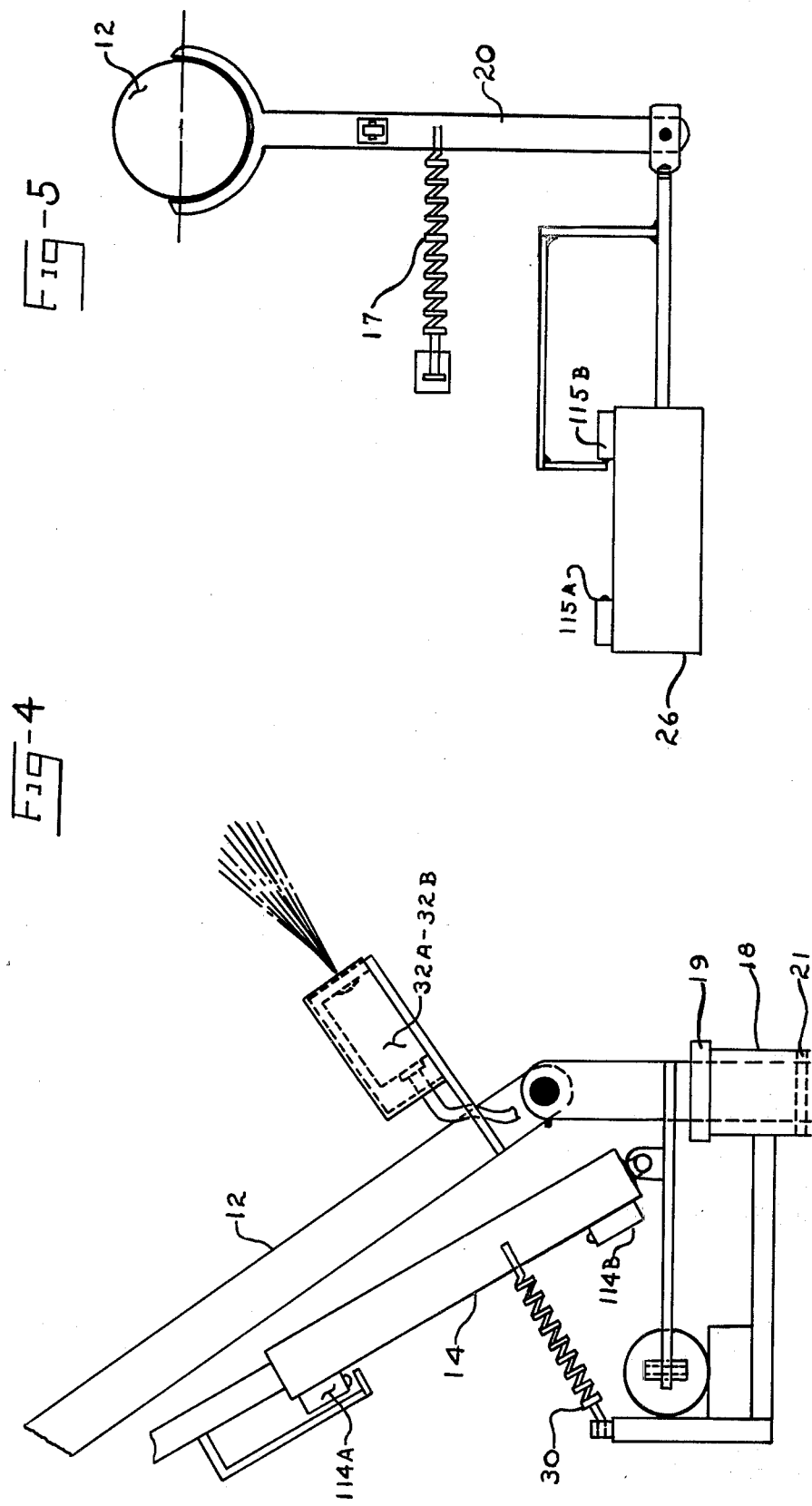

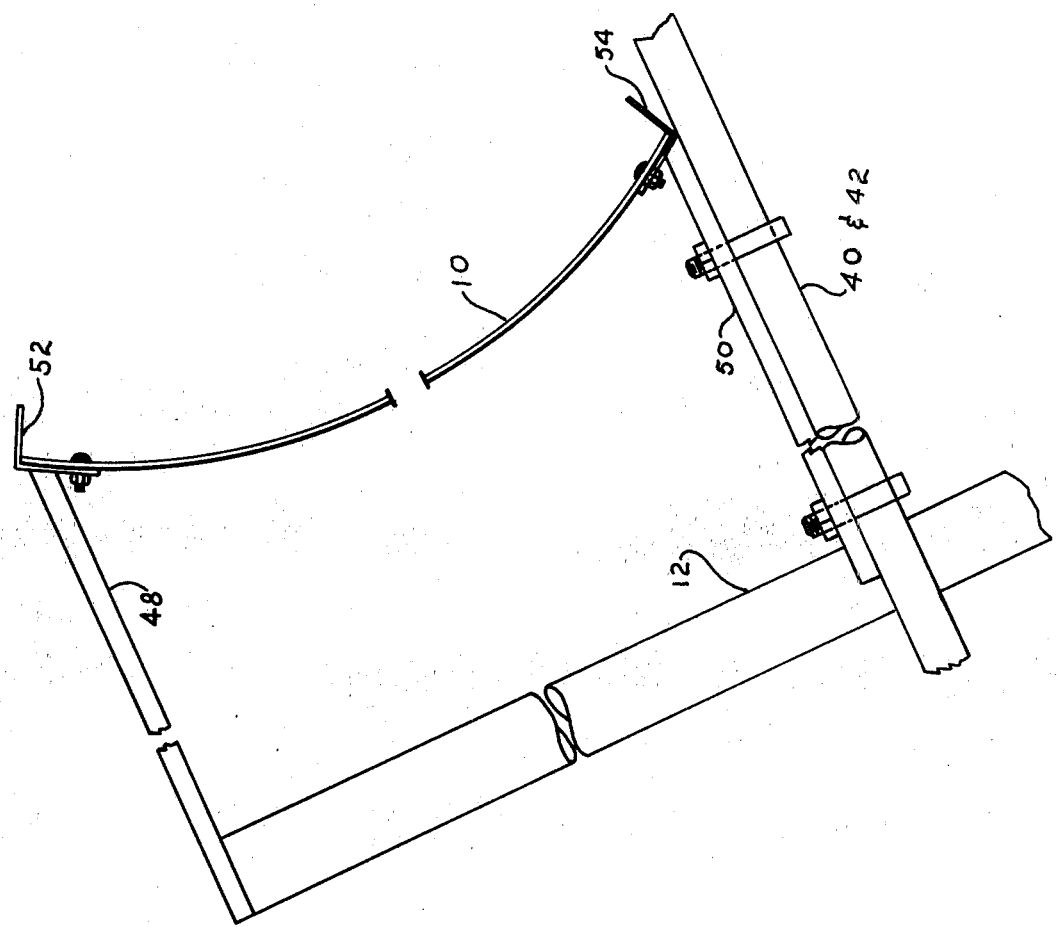

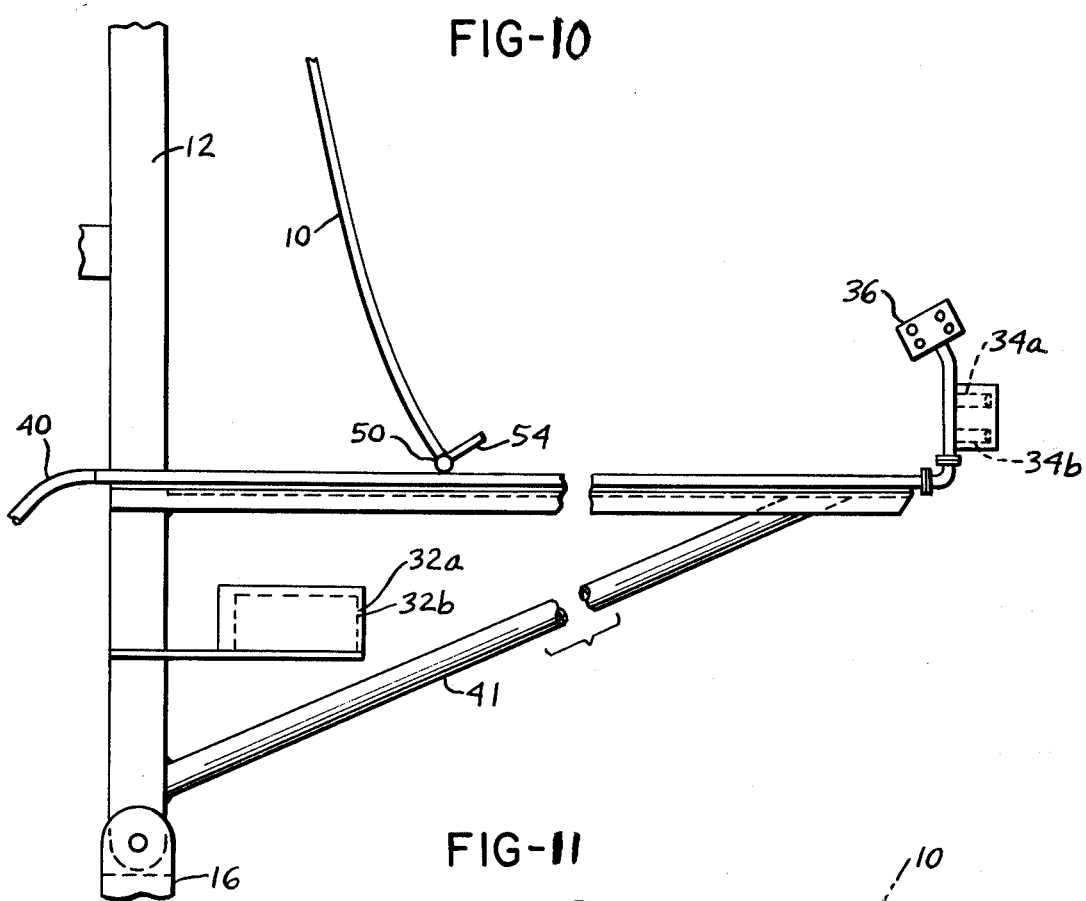
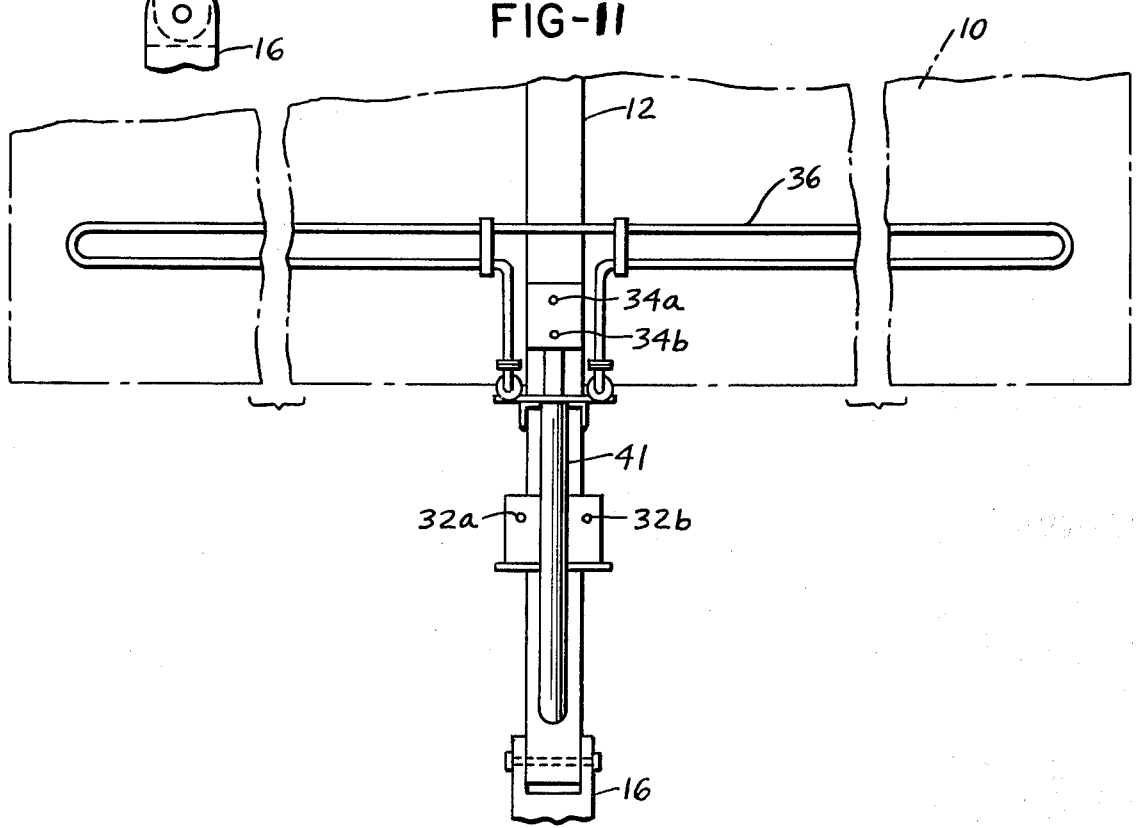

SOLAR ENERGY SYSTEM

This is a continuation-in-part of Ser. No. 788,257, filed Apr. 18, 1977, now abandoned.

BACKGROUND OF THE INVENTION

1. Field of the Invention

This invention relates to energy conservation. More particularly, it relates to use of solar energy to heat hot water and supply it to a radiating unit, preferably placed in a central hot air-air conditioning heating system.

2. Description of the Prior Art

U.S. Pat. No. 3,267,806 of Azegami describes a mirror made of a transparent synthetic resin such as polymethaerylate or a polystyrene. U.S. Pat. No. 4,038,971 of Bezborodke involves a concave-mirrored solar collector having a reflecting surface made of a series of mirrored float glass trips and including a water-carrier pipe disposed along its longitudinal axis provided with motive means for rotating the pipe and the collector body back and forth so that the collector can track the sun. U.S. Pat. No. 4,034,738 of Barber, Jr. concerns a system whereby solar-heated water is conveyed to one or more fan ceil heating units.

SUMMARY OF THE INVENTION

After extended investigation I have found that providing a solar heating system in which a separate plexiglas mirror and a water pipe collector are joined together so that they are adjustable both vertically and horizontally to follow the movement of the sun across the sky from dawn until sunset improves the efficiency of the heating. For best results I I connect the framework for the mirror with the collector by the pipe or piping which circulates water to and from the collector or portion of the water piping or pipe which serves as the collector and use a brace, for example, a 1½" tube, to join the collector pipe with the support structure such as a rod or pipe for the mirror, thereby forming the hypotenuse of a right triangle, as will be made clearer from the more detailed description of the drawing hereinbelow. I employ photoelectric cells in a scanner to turn the mirror and collector together both vertically and horizontally to keep them in line with the sun as it moves across the sky during daylight hours so that its rays are concentrated on my plexiglas mirror and reflected thereby against the pipe or piping in the collector.

My plexiglas mirror is made of plexiglas film or sheet, preferably 1/16 inch to ⅛ inch in thickness, with an acrylic reflective backing, preferably acrylic such as silver acrylic, to concentrate the rays of the sun on my pipe collector so as to heat water therein, which is conducted as called for to a central radiating unit from which heat may be distributed throughout a building via a hot air duct system. The plexiglas mirror concentrates sun rays on the collector as called for by a thermostat and solenoid valves when the heated water temperature reaches 180°–210° F. Heated water from a hot water storage tank circulates, when called for by a thermostat, to radiator coils in a central heating unit, from which the radiated heat is circulated in a hot air system through ducts by a central heating fan. When not enough sun to operate the solar system, a switch may be used to convert to a conventional hot air-air conditioning unit.

Two photoelectric cells of the scanner turn the mirror and collector both vertically and horizontally to keep them lined up with the sun. Each morning when the sun comes up the mirror and collector are automatically turned 60° backward to face the sun in the east. A water pump is employed for circulating the water.

According to my invention, water is recycled by the pump cool, after losing the heat radiated therefrom while hot, to the heat collector when the water contained therein reaches a preset temperature, for example, 190°–210° F. The water in the collector is heated by rays from the sun concentrated thereon by the concave plexiglas mirror, which moving along with the collector, is kept by cylinder-type scanners so that the sun continues at 90° thereto in as it moves through the sky. Hot water is automatically pumped at a predetermined temperature from the collector to an insulated heat storage tank in which the water remains sufficiently hot to heat a home up for three days without further heating. It is circulated from the storge tank automatically at a predetermined temperature to a heating coil in the central heating unit, for example, as called for by a thermostat.

My novel mirror is made by forming or bending reflective plexiglas film or sheet into a concave shape to fit between frames, preferably, metal, for example, of angle-iron, and to conform to the shape or contour of the circumference of a circle, the axis of which is the center of the circle so as to be 90° abeam the mirror as both collector and mirror move together as an integral unit. That is, the mirror and collector are positioned such that when they are adjusted by a photocell-sensor (cylinder) system to face the sun, the sunlight is reflected 90° and concentrated on the collector. I have had especially good results using a circle with a radius of 9 feet 5 inches. The plexiglas film which I employ is coated on the back, preferable with acrylic paint sprayed on for reflectivity. It has a preferred size of 4 feet by 6 feet and is, as explained hereinabove, preferably 1/16–⅛ inch thick. I have found a ⅛-inch thickness to give best results.

My plexiglas mirror and collector, through use of photocell-activativated cylinders, is moved or adjusted both vertically and horizontally to follow the sun during the daylight hours as it moves across the sky so that the rays of the sun are directed toward the mirror. When the sun comes up in the morning the mirror is automatically turned back to the east so that it faces the sun to begin the cycle for another day.

More specifically as to the operation of the horizontal and vertical cylinders or scanners, as they adjust the mirror and collector or correct their position horizontally and vertically so that they follow the course of the sun, I employ a relay causing the mirror and associated collector to rotate to an east position at the beginning of the day. The collector automatically stops at 90° to the sun. At this hour the sun is at at a low angle and close to the horizon. Consequently, the vertical scanner receives a signal from a vertical photocell which I use according to my invention calling for it to lower the collector. The photocell is associated with relays and a solenoid, which is activated thereby, causing the vertical cylinder to tilt the mirror and collector to a position more abeam to the sun. Thus, the horizontal and vertical scanners align the collector and mirror with the sun as it rises. They continue to do so during daylight hours as long as there is enough sunlight to cause the photocells to operate and instigate the necessary correction.

In operating my solar thermal transfer system, I prefer to use four photocells, two vertical and two horizontal, two cylinders, one horizontal and one vertical, three solenoid valves, preferably 110 VAC low pressure, four limit switches, one motor starter, one hydraulic pump and motor, preferably 110 VAC. These are shown in the drawing which will be described hereinafter.

DESCRIPTION OF THE DRAWING

For a more specific description and a better understanding of my invention, reference will now be made to the drawing, which is illustrative of the invention.

In the drawing,

FIG. 4 is an enlarged side view of a portion of the mirror depicted in the system of FIG. 1, showing in more detail the horizontal and vertical correctional cylinders which adjust the mirror and associated collector so that they follow the movement of the sun.

FIG. 5 is a top view or view from above of the mirror portion shown in FIG. 4.

FIG. 6 is an enlarged view of portions of the mirror of FIG. 1 showing the bolting of the mirror to angle irons in more detail.

FIG. 10 is an enlargement of a portion of FIG. 1, showing additionally a brace which connects a supported flexible pipe which joins the collector to the supporting structure for the mirror and together with cylinder means, and other adjusting enables the collector to move and turn with the collector vertically and horizontally.

FIG. 11 is an end view, partially in perspective, looking at the enlargement shown in FIG. 10 from the mirror toward the collector, again showing the functional relationship of the brace of FIG. 10 to the integral movability of the mirror and collector joined by the supported pipe.

Referring to FIG. 1, an acrylic-backed plexiglas mirror 10 comprising mirror 10, held at angle irons 48 and 50 between anchored edges 52 and 54 and mounted on a supporting structure 12 which is anchored in a supporting pad 22, is adjusted so as to be struck directly at right angles by rays 46 coming from the sun (not shown) which are reflected to strike pipe-containing collector 36 by means of vertical correction cylinder 14, which is connected to lower supporting arm 16 via horizontal operating arm 20. Photocells 114a and 114b operate vertical correction cylinder 14 and photocells 34a and 34b, in juxtaposition with temperature switch 38, operate horizontal operating arm 20. Thus, mirror 10 and collector 36 joined together as shown in more detail in FIGS. 10 and 11 by supported flexible pipe 40 mounted on mirror supporting structure 12 via brace 41, may be aligned, using the correction cylinders, so as to follow the sun as it moves across the sky from east to west during daylight hours. Water heated in a collector 36 is conducted via flexible circulating pipes 40 and 42 to heat storage tank 56 of FIG. 2.

In FIG. 2, when a building thermostat calls for heat when set in a solar position (as opposed to a hot air heat position), heated water circulates from solar collector 36 upon automatic closing of switch 65, when temperature sensor 73 of FIG. 2 indicates the need, via lines 40 and 42 to hot water storage tank 56, from which solenoid valve 64 circulates it be pump 60 through line 58 and 62 and then via pipe 68 to a heat coil to provide hot air heat blown by a fan operated by fan motor through ducts 67 throughout the building to be heated. When hot water from tank 56 is not called for by thermostat 75, the water circulates via lines 66 and 40 when temperature switch 65 calls for cooler water.

Figure 7:
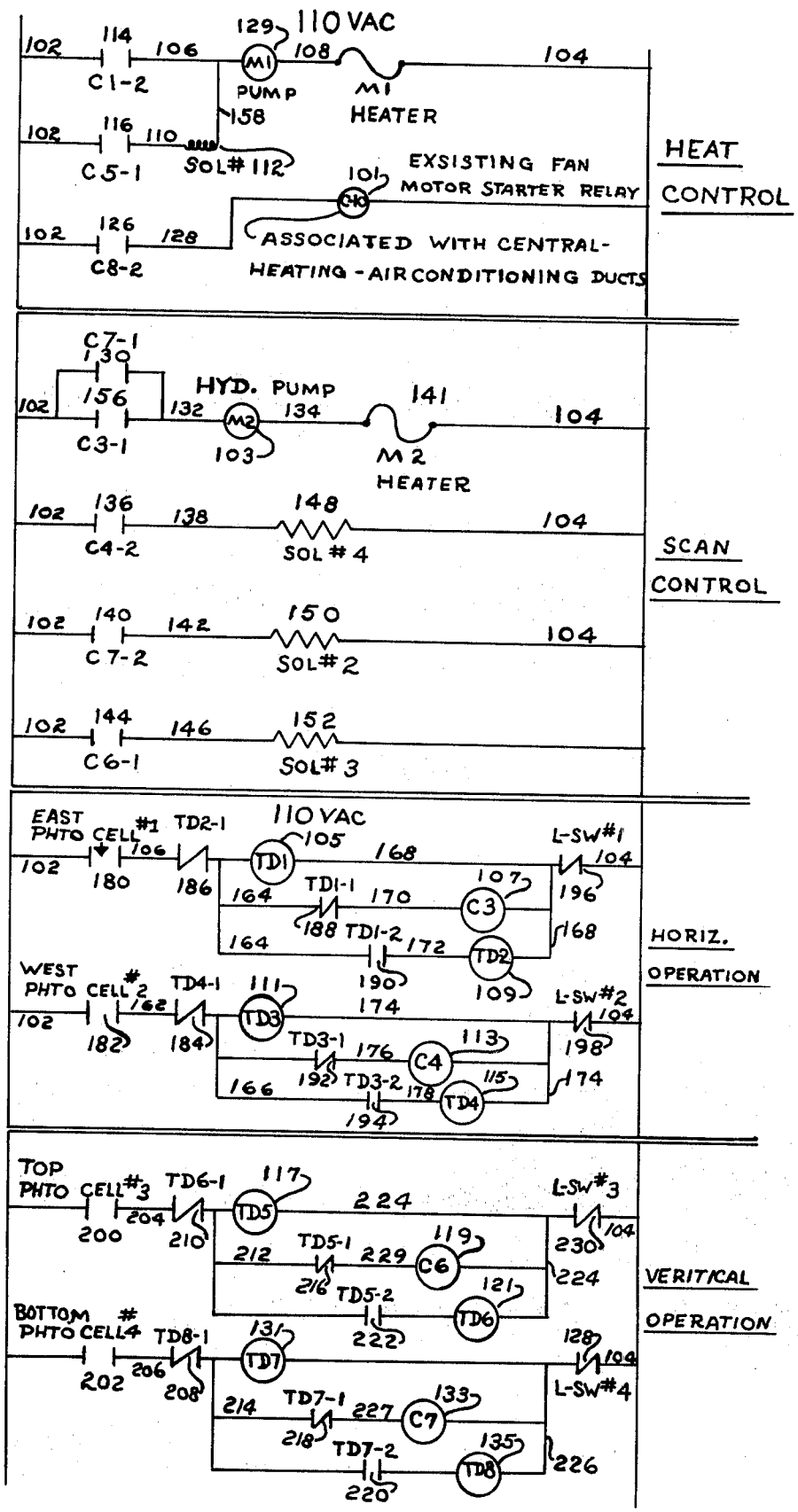
FIG. 7 is an electrical diagram depicting how the scanner and high voltage heat control units operate according to the invention.
Figure 8:
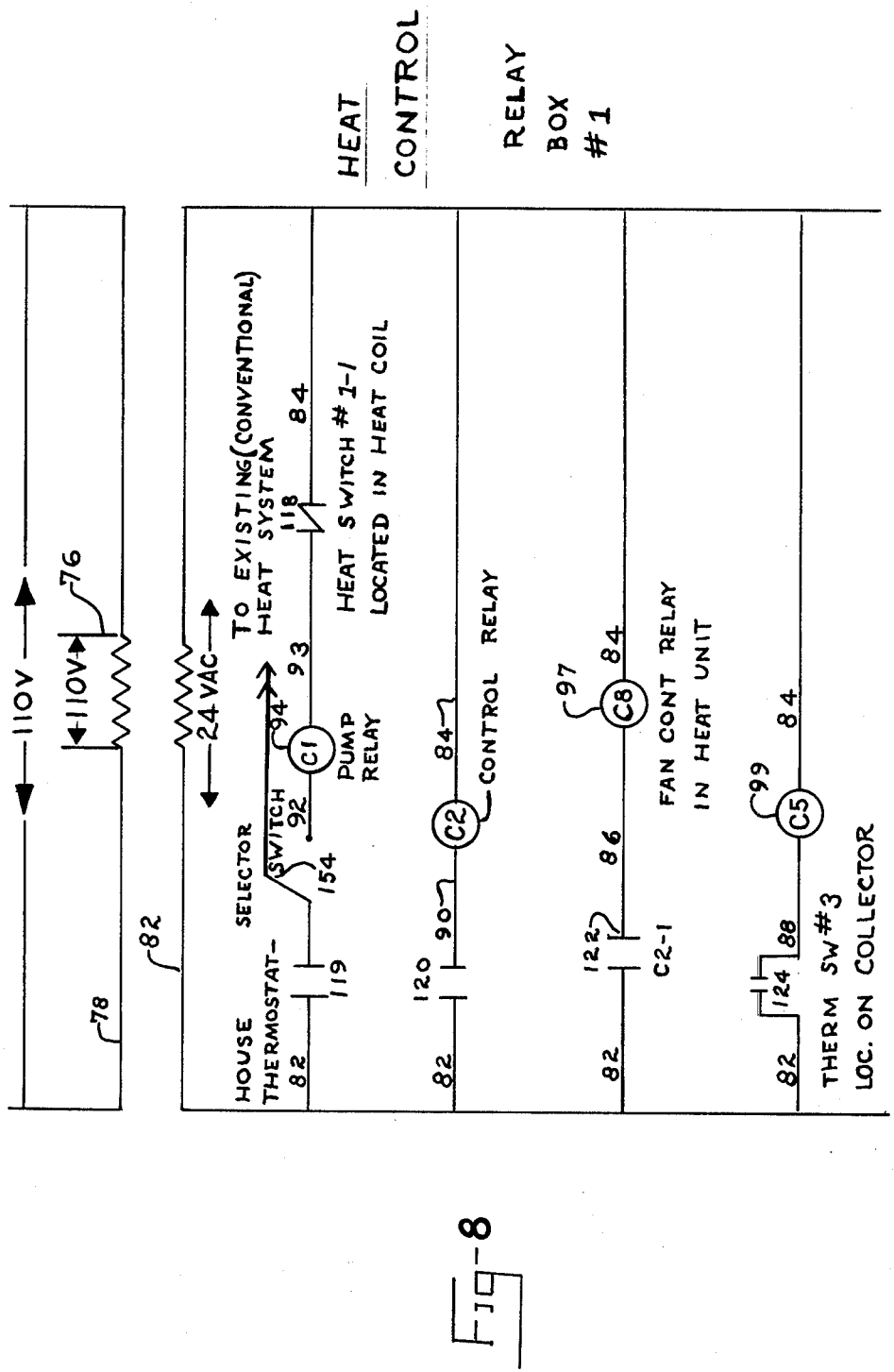
FIG. 8 is an electrical diagram showing the heat control setup used in the invention.
Figure 9:
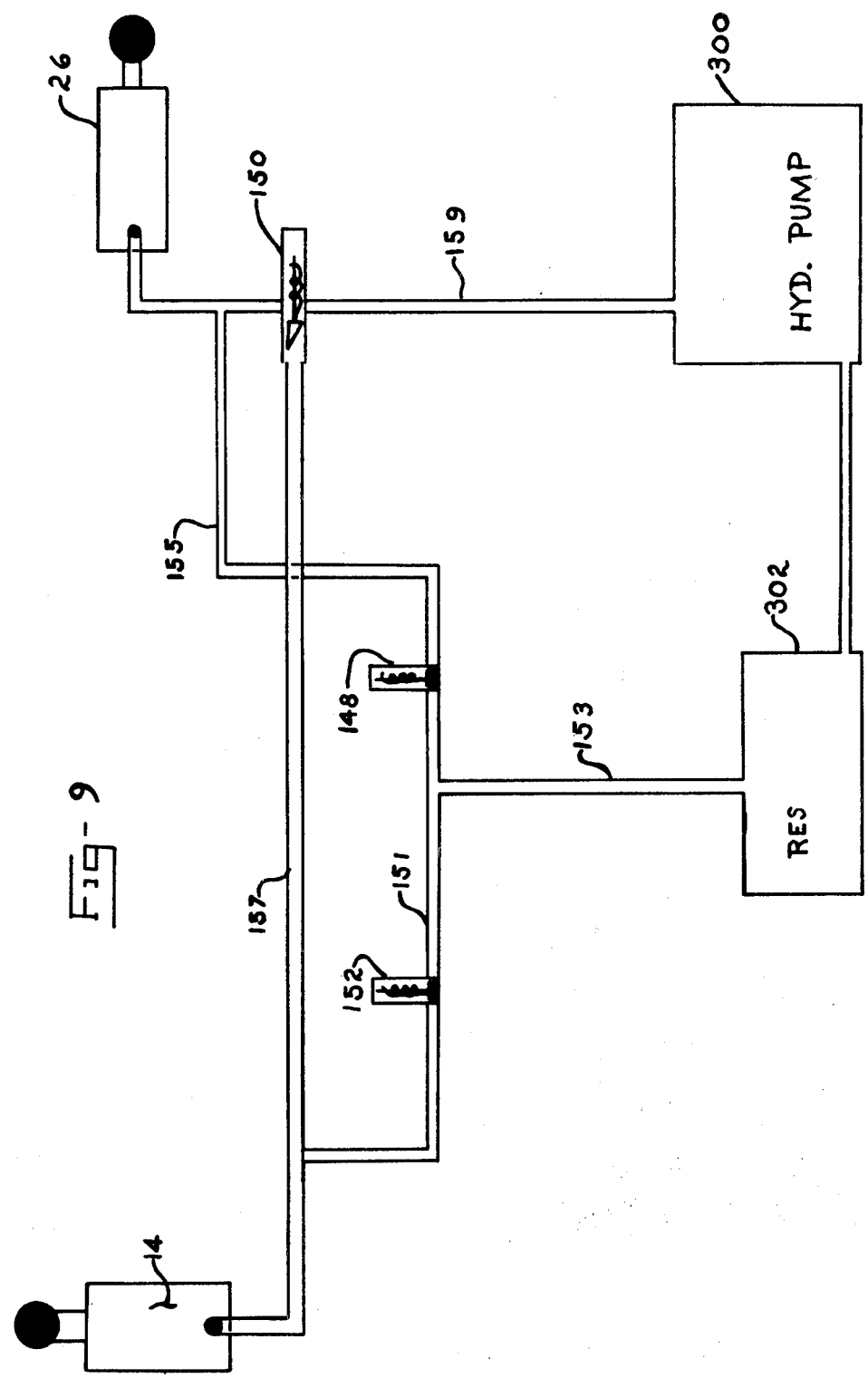
FIG. 9 is a sketch or schematic drawing of the hydraulic mechanism of the solar heating system of the invention.

Looking more particularly at FIG. 7 and related parts, as the morning sun rises to the east, the No. 1 cell 32a senses the sun rays and causes contacts 18c to close, energizing lead 106 through normally closed contacts 186 and energizing circuits 164, time delay 105 circuits 168 through limit switch 1 and contacts 196, to lead 104 and time delay 105. At the same time control relay 107 is energized by lead 164 and normally closed contact 196, energizing control relay 107. This causes contact 156 to close, energizing lead 132, relay 103 and lead 134 through motor starter fuse 141 to lead 104. By energizing relay 103 hydraulic pump 300 starts and pump 300 starts and pump 300 runs until time delay 105 times out 10 seconds, causing 105 to operate. This contacts 188 to open, de-energizing control relay 107, at the same time closing contacts 107 and causing a 30-second time delay 109 to be energized through leads 172 and deenergizing control relay 107. This causes contact 156 to open and hydraulic pump 300 to stop. When 30 seconds have elapsed, 2 time delay 109 operates. By then the photocell 32a will have had time to operate back to the normally open position. It takes 20 seconds from the time the photocell senses the correction unit it operates. Time delay relay 109 times out, causing contact 186 to open. This causes lead 64 to deenergize the whole circuit, acting as a reset. At this time mirror 10 will have been adjusted so as to face the sun at 90° to the sun or limit switch 115b operates, indicating full east deflection, de-energizing the complete circuit by opening contact 196.

As the sun moves toward the west, photocell 32b operates, causing contact 182 to close, which energizes lead 162, contact 184, circuit 166, time delay 111, contact 192, control relay 113, leads 174 and contacts 198 to 104. Time delay 111 starts a 10-second time out, at the same time control relay 113 operates, causing contact 136 to close, incorporating lead 138, solenoid 148 and lead 104. As solenoid valve 148 operates, it allows horizontal cylinder 26 to retract, causing the mirror to deflect to a more westerly position. When time delay 111 times out 10 seconds, it operates. This causes contact 192 to open, de-energizing control relay 113, which, in turn, opens contact 136 and de-energizes solenoid 148, causing mirror 10 to be at rest. At that time contact 182, the circuit will de-energize until another correction is sensed. However, if the correction was not ample to cause photocell 32b to oprate, contact 182 will remain closed, and when time delay 115 times out 10 seconds, it will operate, causing contact 184 to open, momentarily resetting both time delay 111 and time delay 115, causing another cycle to begin. This procedure will continue until mirror 10 is once again aligned 90° to the sun or limit switch 115a operates, causing contact 198 to open, de-energizing the complete circuit.

As the sun moves from the east to the west, the relative vertical position of the sun to the mirror also changes. Thus, the need for a method of correcting for this change to allow maximum efficiency at all times. The vertical scan operates as follows:

As the sun moves higher in the sky, top photocell 34a senses and operates, causing contact 200 to close. This, in turn, energizes circuit 204, normally closed contact 210, circuit 212, time delay 117, normally closed contact relay 119, circuit 224 and normally closed limit switch 104. This begins a 10-second time delay 117, and energizes solenoid 152. Solenoid 152, located in the hydraulic return line 157, allows cylinder 14 to retract, causing the mirror 10 to tilt to a more aft position, in doing so better aligning itself with the rays of the sun. After 10 seconds have elapsed, time delay 117 times out and operates. This causes normally closed 216 to open and deenergizes solenoid 152, which causes mirror 10 to stop its aft movement. At this time contact 222 closes, causing time delay 121 to begin to time. This gives photocell 34a time to sense the correction and operate, causing contact 200 to open. In the event the correction was not sufficient to operate photocell 34a, contact 200 will remain closed. Time delay 121 will time out and operate, causing contact 210 to open, momentarily breaking the circuit and causing time delay 117 to de-energize, which causes contacts 222 to open and contact 216 to close. This de-energizes time delay 121, if the photocell still indicates a correction. The process will be repeated until aft correction is ample or switch 114b operates, causing contact 230 to open, which de-energizes the whole circuit.

As for forward correction, after the sun reaches its highest position relative to the horizon, it will begin to descend as it moves to the west. As described, the horizontal scan will correct for best horizontal alignment, but one must compensate for the decrease in the relative angle of the sun to the mirror. This is done by incorporating the forward correction circuit as follows:

As the sun descends, forward correction photocell 34b sneses the needed correction. When photocell 34b operates, this causes contact 202 to close, which energizes circuit 206, normally closed contact 202 to close, which energizes circuit 206, normally closed contact 208, lead 214, normally closed contacts 218, circuit 227, control relay 133 and time delay 131, circuit 226, contact 228 to circuit 104. Time relay 131 begins a 10-second delay. 133 operates, causing contacts 130 and 140 to close. This causes hydraulic pump 300 to start and solenoid 150 to operate. This allows the mirror to tilt to a more forward position as time delay switch times out. When time delay 131 operates, this causes control relay 133 to de-energize, resulting in pump 300 and solenoid 150 de-energizing. At this time the mirror is at rest. Time allows the photocell 34b 30 seconds to sense the correction and operate. Time delay 135 begins to time a 30 second delay make. This allows the photocell 34b 30 seconds to sense the correction and operate. Time delay 135 will time out 30 seconds and operate causing contact 208 to open, which, in turn, causes time delay 7 and time delay 8 to de-energize, resetting the circuitry until the next time the photocell senses a correction is needed.

This process continues as often as necessary to maintain alignment of the mirror, with limit switch 144a operating to cause contact 128 to open, de-energizing the circuit.

The building temperature is thermostatically controlled according to my invention as follows:

With building thermostat selector switch 154 set at solar position, thermostat contacts 119 close when the temperature in the house falls below a pre-determined setting, for example, 68° F. When this happens, circuit 92 causes circuit 93 and 84 to be energized. At this time, with control relay 113 energized the contacts 114 close, causing M1 pump motor relay 108 to be energized which starts water transfer pump 60. As long as temperature switch 1 and 73 located in the heat exchange coil in central air duct 67 remains in the normally closed position, the pump will continue to transfer hot water from the heat storage tank to the heat exchange coil.

Figure 1:
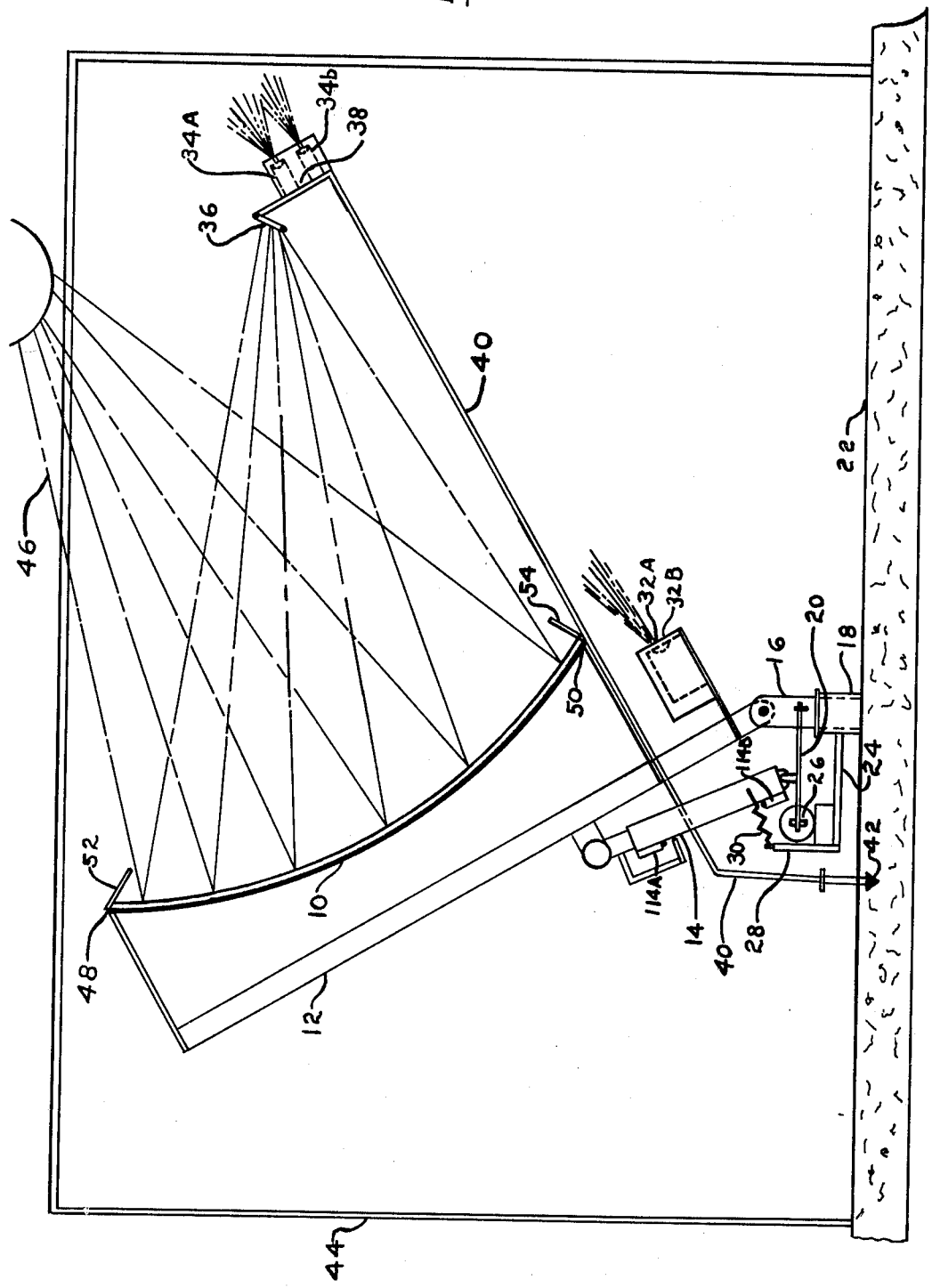
FIG. 1 is a semi-schematic longitudinal cross-sectional view of the solar heat collecting portion of the invention, showing particularly the plexiglas mirror and associated scanning system and collector.
Figure 2:
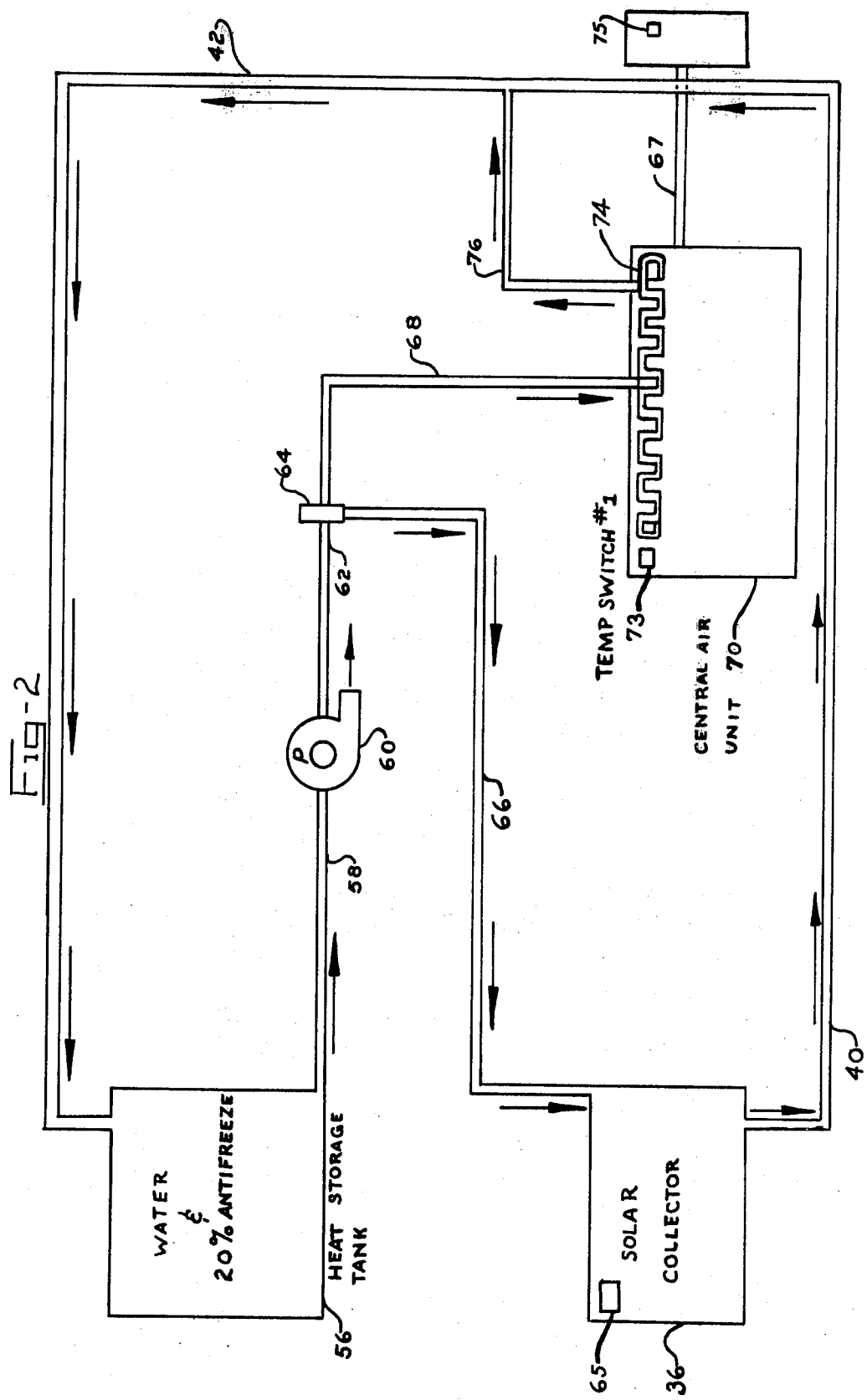
FIG. 2 is a diagrammatic view in flowsheet sorm of the water circulation portion of the solar heat thermal transfer system of the invention.
Figure 3:
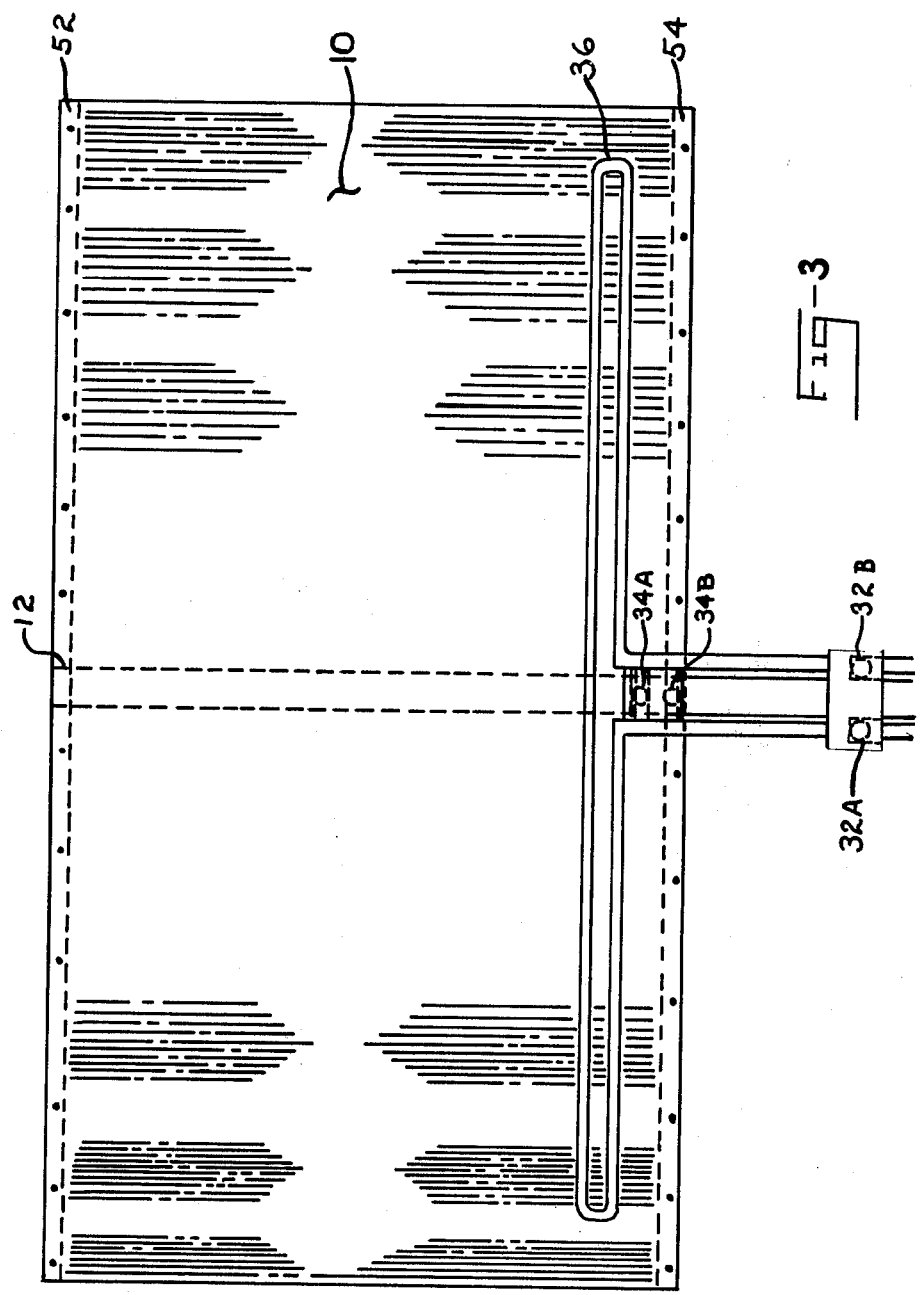
FIG. 3 is a front view of the plexiglas mirror/collector unit of the invention.

When the water from the heat storage tank 56 to which water may be added as needed to supply an air bubble-free full water circulating system heats the heat exchange coil 74 to, say 140° F., temperature switch No. 1 and 73 will operate, energizing contact relay 194 and lead 90. This causes C2 control relay 84 to be energized, which causes control relay contacts 122 to close and through lead 86, operates C8 fan control relay 97, thereby energizing C8 control relay 97, which controls contact C8 and causes 126 to close, resulting in lead 128 operating a fan control relay (not shown) in a central hot air heating unit. This, in turn, starts air circulating through building hot air ducts 75. As air is passed through heat exchange coil 74 (FIG. 2), it is heated, the resulting hot air being distributed throughout the building. This continues until the building is warmed to 68° F. and the building thermostat operates, which causes thermostat contact 119 to open through switch 154. Circuits 92 cause C1 control relay 94 to de-energize when heat exchange coil temperature switch 173 is cooled to the point of operation. Contact 120 will now open, and through lead 86, de-energize control relay 97, causing contact 126 to open and causing fan motor 101 to stop. This cycle repeats as often as nexessary to maintain the temperature set by the thermostat. In the event of long periods of lack of sunlight selector switch 155 or a thermostat switch may be turned to "gas hot air" so as to employ prior art gas hot air heat.

Cooler water is supplied by operation of a heat control circuit from the heat storage tank 56 to the solar collector 36 (FIG. 2), at the same time sending hot water in solar collector 36 to heat storage tank 56, to which water may be added via a suitable conduit (not shown). As the water in the collector 36 reaches 185° F., the predetermined temperature, collector 36 operates. This causes contacts 24 to close and to energize lead 88, causing relay 99 to operate. Control relay 99 in turn causes contact 116 to close, operating transfer solenoid 112 through circuit 110. This in turn causes lead 158 to energize and pull in motor starter relay 129, which starts pump 60 with solenoid 112. In this position, cooler water flows to the collector and hot water flows to the heat storage tank. Temperature switch No. 1 1,73 causes cooler water to flow to the heat storage tank. When the cooler water reaches the temperature switch, the switch operates in the opposite direction, causing control relay 99 to de-energize, thus opening contacts 116, de-energizing circuit 110, solenoid 112, circuit 158 and starter relay 129. At this point pump 160 stops, and solenoid 112 returns to its normal position. The system then remains at rest until the house needs heat or the collector 36 needs cooler water.

DESCRIPTION OF THE PREFERRED EMBODIMENT

A 2700 square foot home was heated at a cost of $4.00 per month by employing a plexiglas mirror solar energy transfer system such as described herein and as depicted in FIGS. 1-4. The system operated at an efficiency of about 60% to 75% with a minimum of 25% of sunlight during daylight hours. The concave shape of the plexiglas mirror and multi-directional tracking ability of the integral mirror-collector unit resulted in production of a substantial amount of hot water radiant heat circulated by a hot air duct system even on a hazy day.

While the invention has been described in terms of preferred embodiments, the claims appended hereto are intended to encompass all embodiments which fall within the spirit of the invention.

Having thus described my invention and certain preferred embodiments thereof, I claim:

1. In a hot air heating system the improvement which comprises a heat collector and plexiglas mirror sunlight reflecting means for heating water in said collector integrally connected by means of circulating piping and means for vertically and horizontally alignable according to the sun's position, a water source, a storage tank for said water, piping means for circulating water from said collector to said storage tank, from said storage tank to a central air unit for radiating heat to hot air ducts and back to said collector, and multidirectional means for aligning said reflecting means and collector so as to follow the sun and cause its rays to hit said reflecting means at substantially a right angle and be reflected directly against said collector, wherein said plexiglas mirror sunlight reflecting means comprise a sheet of plexiglas held between two anchored edges therof in concave form and having a reflective backing and said two edges are anchored by bolting to angle irons and supported by upper and lower support arms, wherein said reflective backing comprises silver acrylic, wherein said multidirectional means for aligning said reflecting means and collector comprise a photoelectric cell scanner, wherein said collector and reflecting means have means for adjusting same responsive to associated photocells which detect the position of the sun in the sky and cause said mirror to make correction whereby it substantially continually faces the sun during sunlight hours, and photocell-cylinder sensor means for adjusting the position of said collector and sunlight reflecting means multidirectionally whereby said collector said collector and sunlight reflecting means continue to face the sun as they move across the sky during daylight hours, thermostat responsive means for automatically circulating hot water from said storage tank to said central air unit when the inside temperature of a building employing said system falls to a temperature below a selected pre-set temperature, and temperature-responsive sensor means for automatically circulating hot water from said collector to said storage tank and for circulating cooler water to said collector when the temperature of the water in said collector climbs to a selected pre-set temperature.

2. The system of claim 1 wherein said scanner operates hydraulically by means of cylinders.

3. The system of claim 1 wherein said piping means include means for beginning circulation of hot water from said tank to said radiation unit at a predetermined temperature and means for beginning circulation of cold water to said collector when the temperature of the water in said collector reaches a predetermined temperature.

4. The system of claim 1 including a solenoid valve positioned downstream from said tank which opens when a thermostat calls for heat, when a building to be heated reaches a predetermined temperature, thereby causing circulating of hot water from said tank to said central air unit.

* * * * *